United States Patent
Antonio et al.

(12) 
(10) Patent No.: US 6,342,573 B1
(45) Date of Patent: Jan. 29, 2002

(54) PROCESS FOR THE PREPARATION OF END-PRODUCTS BASED ON VINYLAROMATIC POLYMERS WITH A PREDOMINANTLY SYNDIOTACTIC STRUCTURE

(75) Inventors: Gennaro Antonio, Cameri; Giannotta Giorgio, Novara, both of (IT)

(73) Assignee: Enichem S.p.A., San Donato Milanese (IT)

( * ) Notice: Subject to any disclaimer, the term of this patent is extended or adjusted under 35 U.S.C. 154(b) by 0 days.

(21) Appl. No.: 09/292,848

(22) Filed: Apr. 16, 1999

(30) Foreign Application Priority Data

Apr. 30, 1998 (IT) .......................................... MI98A0934

(51) Int. Cl.⁷ .............................. C08F 12/04; C08F 6/00
(52) U.S. Cl. ................ 526/347.2; 526/346; 528/502 A; 528/502 C; 528/503; 264/125; 264/126
(58) Field of Search .............................. 528/502 C, 503, 528/502 A; 264/125, 126; 526/347.2, 346

(56) References Cited

U.S. PATENT DOCUMENTS

| | | | | |
|---|---|---|---|---|
| 3,301,929 A | * | 1/1967 | Bruun | ........................ 264/126 |
| 5,629,391 A | | 5/1997 | Cardi et al. | |
| 5,721,327 A | | 2/1998 | Santi et al. | |
| 5,728,784 A | | 3/1998 | Po' et al. | |
| 5,830,959 A | | 11/1998 | Po' et al. | |
| 5,914,375 A | * | 6/1999 | Tsai et al. | ............. 526/347.2 X |
| 6,066,280 A | * | 5/2000 | Abbondanza et al. | ....... 264/126 |

FOREIGN PATENT DOCUMENTS

| | | |
|---|---|---|
| EP | 0 570 931 | 11/1993 |
| EP | 0 780 405 | 6/1997 |
| EP | 0 857 555 | 8/1998 |
| GB | 943 396 | 12/1963 |

OTHER PUBLICATIONS

Derwent Publications, AN 88–158432, JP 63–099202, Apr. 30, 1988.

Derwent Publications, AN 98–007342, Research Disclosure, vol. 402, No. 058, "Syndiotactic Polystyrene Yarns for Industrial Textiles," Oct. 10, 1997.

Derwent Publications, AN 96–483935, Research Disclosure, vol. 390, No. 037, "Syndiotactic Polystyrene for Filters and Nonwovens—can be Melt Extruded to Form Net–Like Filters of Injection Molded to Form Disposable Liquid Cartridge Filters, and Processed into Battery Separator," Oct. 10, 1996.

* cited by examiner

Primary Examiner—Fred Teskin
(74) Attorney, Agent, or Firm—Oblon, Spivak, McClelland, Maier & Neustadt, P.C.

(57) ABSTRACT

Process for the preparation of end-products based on vinylaromatic polymers with a predominantly syndiotactic structure which comprises:

a) compressing the polymer in powder form in a mould at a pressure ranging from 0.1 to 500 Mpa;

b) sintering the compressed powder, under pressure, at a temperature ranging from the glass transition temperature of the polymer (Tg) to 150° C.;

c) slowly cooling the end-product to room temperature.

9 Claims, No Drawings

PROCESS FOR THE PREPARATION OF END-PRODUCTS BASED ON VINYLAROMATIC POLYMERS WITH A PREDOMINANTLY SYNDIOTACTIC STRUCTURE

The present invention relates to a process for the preparation of end-products based on vinylaromatic polymers with a predominantly syndiotactic structure and the end-products thus obtained.

More specifically, the present invention relates to a process for the preparation of plates by the compacting, at a temperature lower than the melting point, of powders of vinylaromatic polymers with a predominantly syndiotactic structure and the plates thus obtained.

The preparation of end-products based on polymers by the sintering of the corresponding polymers in powder form, is known. In fact, some polymers require, for reasons relating to a low intrinsic molecular mobility, particular transformation methods which enable the production of an end-product without necessarily having to pass through the conventional transformation processes essentially based on the complete melting of the materials.

Products of this kind are fluorinated polymers, ultra-high molecular weight polyethylene (UHMWPE) and other polymers such as polyphenylenesulfide whose macromolecular structure is partially cross-linked. In these polymers, in fact, the extremely high viscosities of the molten product, which occur in conventional transformation technologies such as extrusion, injection moulding, calendering or thermocompression, make transformation processes both difficult and costly. In addition, the development of extremely high shear-rates easily causes fluid-dynamic irregularities and chain separation.

Alternative transformation processes comprise two distinct operating steps. In the first an aggregation of the powders is effected by subjecting them to high static pressure. In the second the real sintering of the material is carried out by means of thermal treatment at a high temperature (free-sintering) capable of producing the complete coalescence of the particles and elimination of the void spaces. For example, in the case of polytetrafluoroethylene (PTFE), the material in powder form is preformed by compression of the powders at a temperature which is not high (below 100° C.) and a pressure of 200–350 bars, and is then sintered at a temperature of 370–390° C. in air-circulated ovens.

Another alternative transformation process is that known as "pressure sintering", typical of both PTFE and UHMWPE. In this case the preform under pressure is heated for the sintering step after a partial pressure release. This step is followed by a thermal post-treatment phase to eliminate internal stress in the product thus formed.

In the case of UHMWPE the preferred technology is "pressure sintering" in which the powders are subjected to temperatures of 200–250° C. and pressures of 4–10 MPa. This is therefore compression moulding in which viscous slip phenomena however are greatly limited due to the high viscosity of the material.

The sintering processes described above cannot normally be effected with thermoplastic polymers which have viscosities in the molten state compatible with the traditional transformation technologies, for two reasons. The first is linked to productivity and the second to the fact that, in most cases, end-products made by sintering at a low temperature, have lower physico-mechanical characteristics than those of analogous end-products made with traditional technologies.

In this context, the Applicant has surprisingly found that, in the case of vinylaromatic polymers with a predominantly syndiotactic structure, it is possible to obtain complete aggregation of the material and produce compact and homogeneous end-products, at the same time remaining decisively below its melting point.

This behaviour does not apply to other thermoplastic polymers, for example in semicrystalline polymers such as polyethyleneterephthalate (PET) or polyethylene (PE), as is demonstrated in both the art (for example, Advance in Polymer Technology, Vol. 12, Nr. 3, pages 281–289, 1993) and in the illustrative examples which will follow hereinbelow.

The examples provide comparisons in which semi-crystalline polymers (PET or PE) and syndiotactic polystyrene (SPS) are moulded or extruded with conventional technologies and by compaction of the powders at a temperature lower than the melting point. As can be seen, for PET and PE, very distinct differences in properties in the end-products are observed, proving that these materials are not suitable for being subjected to an effective aggregation and compaction process under these conditions. On the contrary, end-products obtained from SPS powders have, after compaction, characteristics which are comparable with or even higher than analogous end-products moulded or extruded in the conventional way.

In fact, the densities normally obtained by the compaction at low temperatures of powders of thermoplastic polymers (for example PET or PE), normally have values that are 5–20% lower than the effective density of homogeneous end-products. This leads to a deterioration in the surface appearance and homogeneity of the end-products which inevitably reflects a loss in the mechanical properties.

The present invention therefore relates to a process for the preparation of end-products based on vinylaromatic polymers with a predominantly syndiotactic structure which comprises:

a) compressing the polymer in powder form in a mould at a pressure ranging from 0.1 to 500 Mpa;

b) sintering the compressed powder, under pressure, at a temperature ranging from the glass transition temperature of the polymer (Tg) to 150° C.;

c) slowly cooling the end-product to room temperature; and wherein the polymer in powder form is obtained by a process which consists of the following operating steps:

i) polymerizing at least one vinylaromatic monomer in the presence of a catalytic system capable of producing a polymer with a predominantly syndiotactic structure;

ii) recovering the polymer by precipitation and filtration;

iii) drying the polymer at atmospheric pressure and at a temperature ranging from 20 to 80° C.

According to the present invention, preferred end-products based on vinylaromatic polymers are flat plates with a thickness of more than a millimeter and particularly with thicknesses ranging from 2 to 4 mm.

Vinylaromatic polymers with a predominantly syndiotactic structure are products which are known in literature and described, for example, in European patent 210.615 or in U.S. Pat. No. 5.142.005. Particularly preferred are vinylaromatic polymers selected from polymers of styrene and derivatives of styrene and the relative copolymers containing up to 20% in moles of another copolymerizable monomer selected from those having the general formula:

$$CH_2=CH-R$$

wherein R represents a hydrogen atom or a $C_1-C_6$ alkyl radical or a $C_4-C_{12}$ cycloalkyl radical.

Derivatives of styrene comprise alkyl styrenes, wherein the alkyl group contains from 1 to 4 carbon atoms, halogenated styrenes, $C_1-C_4$-alkoxy styrenes, carboxy styrenes, vinylnaphthalenes, such as alpha- or beta-vinyl naphthalene, vinyl tetrahydro naphthalene such as 1,2,3,4-tetrahydro-6-vinyl naphthalene, etc. Typical examples of substituted styrenes are p-methylstyrene, m-methylstyrene, alone or mixed with each other, ethylstyrene, butylstyrene, p-ter-butylstyrene, dimethylstyrene, chlorostyrene, bromostyrene, fluorostyrene, chloromethylstyrene, methoxystyrene, acetoxy methylstyrene, etc.

The polymer is sintered by subjecting it contemporaneously to pressure and temperature. The sintering times, although depending on the operating conditions, are generally between 1 minute and 10 hours. At the end of the sintering the end-product is slowly cooled, for example by simple exposure in a ventilated environment, to avoid the creation of stress that can make the end-product fragile.

The vinylaromatic polymer with a predominantly syndiotactic structure can be prepared with methods known in literature. For example it can be prepared in the presence of catalysts based on titanium or zirconium selected from those having the general formula:

$$MR_1R_2R_3R_4, A_1MR_1R_2R_3, A_1A_2MR_1R_2 \quad (I)$$

wherein the groups $R_1$, $R_2$, $R_3$ and $R_4$, the same or different, represent an (iso)alkyl, (iso)alkoxyl, $C_1$–$C_{10}$ alkylamide radical, a $C_6$–$C_{10}$ aryl radical or a halogen such as chlorine whereas the groups $A_1$ and $A_2$, the same or different, represent a cyclopentadienyl ligand, optionally substituted with $C_1$–$C_{10}$ alkyl radicals or an indenyl ligand; M represents a titanium or zirconium atom.

The catalyst (I) can optionally be combined with a cocatalyst selected from an alkylalumoxane and a compound of boron having formula (II):

$$BX_1X_2X_3 \quad (II)$$

or one of its salts, wherein $X_1$, $X_2$ and $X_3$, the same or different, represent a $C_1$–$C_{20}$ fluorinated hydrocarbon radical.

Examples of these catalysts are described in published European patent application 780.405.

The polymerization can be carried out in an aqueous suspension, in mass or in the presence of a solvent selected from aliphatic or aromatic hydrocarbons, or their mixtures, and is used in such quantities that the volume ratio between solvent and monomers is between 1 and 10. The preferred solvent is toluene.

At the end of the polymerization, the polymer is recovered with the conventional methods. The product recovered is in the form of a fine powder with a particle size of less than 500 micrometres (50 mesh).

Some illustrative but non-limiting examples are provided for a better understanding of the present invention and for its embodiment.

In the examples the tensile tests and tensile modulus measurements were calculated according to ASTM D 638-M3. The impact strength was calculated according to ASTM D 256.

EXAMPLE 1 (Comparative)

Fibre grade PET (polyethyleneterephthalate), produced by Montefibre, Milan, having Tg=75° C., Tm=258° C., a weight average molecular weight Mw=32,000, was used to prepare plates having a thickness of 3 mm, operating according to the thermocompression moulding technology at a temperature 10–15° C. higher than the Tm. The plate was then cooled to room temperature at a rate of about 30° C./min.

The physico-mechanical characteristics of the plate thus obtained are indicated in Table 1.

EXAMPLES 2–3 (Comparative)

The PET of example 1 was cryogenically ground with a Retsch ZM 1 ultracentrifugal mill and sieved with a 50 mesh sieve (particle size less than 500 micrometres). The powder thus obtained was charged into a cylindrical-shaped mould with a piston having a diameter of 80 mm. The mould was placed in a press and subjected to a pressure of 50 MPa for 10 minutes, during which the temperature was maintained at values ranging from Tg and Tm. The mould was then removed and cooled in air and a discoidal-shaped plate having a thickness of about 3 mm was extracted.

The physico-mechanical characteristics of the plate thus obtained are indicated in Table 1.

TABLE 1

|  | Compression Temperature (° C.) | Density (kg/m³) | Tensile strength (MPa) | Tensile modulus (MPa) | Ultimate elongation (%) | Impact strength (J/m) | Molecular weight (Mw) | * |
|---|---|---|---|---|---|---|---|---|
| Example 1 | 270 | 1,450 | 50 | 3010 | 5 | 25 | 31,000 | 1 |
| Example 2 | 170 | 1,375 | 10 | 3132 | 0.4 | 10 | 32,000 | 3 |
| Example 3 | 200 | 1,377 | 9 | 3080 | 0.3 | 12 | 31,000 | 2 |

* = 1: Compact translucent appearance
2: Compact opalescent/opaque appearance
3: Granular opaque appearance (the manufact disgregates when touched)

EXAMPLE 4 (Comparative)

Low density linear polyethylene in powder form, produced by the Applicant under the trade-name of FLEXIRENE CL10, having a melting point Tm of 118° C. was used to obtain plates with a thickness of about 3 mm operating according to the thermocompression moulding technology at a temperature of 200° C. The plate was then cooled to room temperature at a rate of about 30° C./min.

The physico-mechanical characteristics of the plate thus obtained are indicated in Table 2.

EXAMPLES 5–6 (Comparative)

The polyethylene of example 4 was sieved with a 50 mesh sieve. The powder thus obtained was used to prepare discoidal plates according to the method of examples 2 and 3 but operating at a temperature of 80 and 100° C.

In both cases, the final compaction of the plates was not sufficient to effect mechanical characterization, as demonstrated in Table 2.

TABLE 2

|  | Compression Temperature (° C.) | Density (kg/m³) | Tensile strength (MPa) | Tensile modulus (MPa) | Ultimate elongation (%) | * |
|---|---|---|---|---|---|---|
| Example 4 | 200 | 918 | 32 | 90 | 650 | 1 |
| Example 5 | 80 | 770 | n.d. | n.d. | n.d. | 3 |
| Example 6 | 100 | 900 | n.d. | n.d. | n.d. | 3 | n.d.: not determinable
* 1: Compact translucent appearance
2: Compact opalescent/opaque appearance
3: Granular opaque appearance (the manufact disgregates when touched)

EXAMPLE 7

37.8 l of styrene purifed by passage on a basic alumina column and 115 g of solid methylaluminoxane were charged in an inert atmosphere into a 70 l glass reactor. The mixture was heated under stirring to 40° C. and 1.438 g of cyclopentadienyltitanium trichloride dissolved in 150 ml of anhydrous toluene were added. After two hours of reaction, during which the temperature spontaneously rose to 55° C. and then gradually fell, the reaction was interrupted by adding 100 g of sodium hydroxide dissolved in 15 l of methanol. The solid obtained was filtered, suspended in methanol and filtered again. After drying at 60° C. and at atmospheric pressure, 7.8 Kg of polymeric product (21%) were obtained in powder form with a particle size of 50 mesh. The polymer had the following characteristics:

Fraction insoluble in methylethylketone (MEK): 88%;

Weight average molecular weight (Mw): 310,000;

Number average molecular weight (Mn): 160,000;

Concentration of syndiotactic dyads in the insoluble fraction in MEK: 99.5%.

EXAMPLE 8 (Comparative)

The syndiotactic polystyrene of example 7 was used to prepare plates with a thickness of 3 mm operating according to the thermocompression moulding technology.

The polymer, previously granulated, was moulded at a temperature about 15° C. higher than the Tm. The plate was then cooled to room temperature at a rate of about 30° C./min.

The physico-mechanical characteristics of the plate thus obtained are indicated in Table 3.

EXAMPLES 9–12

The syndiotactic polystyrene of example 7 was used to prepare discoidal plates as described in examples 2 and 3.

The physico-mechanical characteristics of the plates thus obtained are indicated in Table 3.

TABLE 3

|  | Compression Temperature (° C.) | Density (kg/m³) | Tensile strength (MPa) | Tensile modulus (MPa) | Ultimate elongation (%) | Impact strength (J/m) | Molecular weight (Mw) | * |
|---|---|---|---|---|---|---|---|---|
| Example 8 | 290 | 1,050 | 19 | 4000 | 0.50 | 7.0 | 240,000 | 1 |
| Example 9 | 100 | 990 | 20 | 3400 | 0.50 | 9.0 | 300,000 | 2 |
| Example 10 | 100 | 1,090 | 20 | 3700 | 0.50 | 9.5 | 300,000 | 1 |
| Example 11 | 120 | 1,050 | 22 | 4070 | 0.70 | 10.0 | 310,000 | 1 |
| Example 12 | 120 | 1,085 | 25 | 4000 | 0.70 | 10.5 | 290,000 | 1 |

* = 1: Compact translucent appearance
2: Compact opalescent/opaque appearance
3: Granular opaque appearance (the manufact disgregates when touched)

What is claimed is:

1. A process for the preparation of end-products based on a vinylaromatic polymer with a predominantly syndiotactic structure which comprises:
   a) compressing the polymer in powder form in a mould at a pressure ranging from 0.1 to 500 Mpa;
   b) sintering the compressed powder, under pressure, at a temperature ranging from the glass transition temperature of the polymer (Tg) to 150° C.;
   c) cooling the end-product to room temperature; and wherein the polymer in powder form is obtained by a process which consists of the following operating steps:
   i) polymerizing at least one vinylaromatic monomer in the presence of a catalytic system capable of producing a polymer with a predominantly syndiotactic structure;
   ii) recovering the polymer by precipitation and filtration;
   iii) drying the polymer at atmospheric pressure and at a temperature ranging from 20 to 80° C.

2. The process according to claim 1, wherein the end-products are flat plates with thicknesses of more than a millimetre.

3. The process according to claim 1, wherein the vinylaromatic polymer with a predominantly syndiotactic structure is selected from the group consisting of polymers of styrene and derivatives of styrene, and copolymers of styrene and derivatives of styrene containing up to 20% in moles of another copolymerizable monomer.

4. The process according to claim 1, wherein the polymer is sintered with sintering times ranging from 1 minute to 10 hours.

5. The process according to claim 1, wherein the vinylaromatic polymer with a predominantly syndiotactic structure is prepared in the presence of a catalyst based on titanium or zirconium selected from those having the general formula:

$$MR_1R_2R_3R_4, A_1MR_1R_2R_3, A_1A_2MR_1R_2 \quad (I)$$

wherein the groups $R_1$, $R_2$, $R_3$ and $R_4$, the same or different, represent an (iso)alkyl, (iso)alkoxyl, $C_1$–$C_{10}$ alkylamide radical, a $C_6$–$C_{10}$ aryl radical or a halogen whereas the groups $A_1$ and $A_2$, the same or different, represent a cyclopentadienyl ligand, optionally substituted with $C_1$–$C_{10}$ alkyl radicals or an indenyl ligand; M represents a titanium or zirconium atom.

6. The process according to claim 5, wherein the catalyst (I) is combined with a cocatalyst selected from an alkylalumoxane and a compound of boron having formula (II):

$$BX_1X_2X_3 \quad (II)$$

or one of its salts, wherein $X_1$, $X_2$ and $X_3$, the same or different, represent a $C_1$–$C_{20}$ fluorinated hydrocarbon radical.

7. The process according to claim 1, wherein the dried polymer is a powder with a particle size of less than 500 micrometres.

8. End-products obtained with the process according to any of the claims from 1 to 7.

9. The process according to claim 5, wherein the halogen is chlorine.

* * * * *